(12) United States Patent
Matsunaga et al.

(10) Patent No.: US 9,746,204 B2
(45) Date of Patent: Aug. 29, 2017

(54) WATER HEATER

(71) Applicant: NORITZ CORPORATION, Hyogo (JP)

(72) Inventors: Hironao Matsunaga, Amagasaki (JP); Shuji Kameyama, Himeji (JP); Keigo Fukunishi, Akashi (JP); Norihide Wada, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 115 days.

(21) Appl. No.: 14/804,005

(22) Filed: Jul. 20, 2015

(65) Prior Publication Data
US 2016/0025377 A1  Jan. 28, 2016

(30) Foreign Application Priority Data

Jul. 28, 2014  (JP) .................................. 2014-152670

(51) Int. Cl.
*F24H 8/00* (2006.01)
*F24H 1/14* (2006.01)
(Continued)

(52) U.S. Cl.
CPC ........... *F24H 8/006* (2013.01); *F23D 14/586* (2013.01); *F23J 15/06* (2013.01); *F23L 17/005* (2013.01);
(Continued)

(58) Field of Classification Search
CPC ... F24H 8/006; F24H 9/00; F24H 8/00; F24D 29/42; F24D 29/59; F24D 29/70; F28D 20/02; F28F 17/005
(Continued)

(56) References Cited

U.S. PATENT DOCUMENTS 4,444,156 A * 4/1984 Iwasaki .................. F24H 1/145
110/203
8,191,512 B2 * 6/2012 Park ......................... F23J 15/06
122/18.1
(Continued)

FOREIGN PATENT DOCUMENTS

JP        68-69742 U    5/1983
JP        60-186655 A    9/1985
(Continued)

OTHER PUBLICATIONS

An Office Action issued by the Japanese Patent Office on Oct. 27, 2015, which corresponds to Japanese Patent Application No. 2014-152670 and is related to U.S. Appl. No. 14/804,005; with English language translation.

*Primary Examiner* — Gregory A Wilson
(74) *Attorney, Agent, or Firm* — Studebaker & Brackett PC

(57) ABSTRACT

A water heater is provided that can suppress backflow (entry) of drainage water into a fan from downstream of the fan in a path of a flow of combustion gas. The fan includes a fan case, an impeller housed within the fan case, a drive source attached to the fan case so as to drive the impeller, and a rotation shaft connecting the impeller and the drive source. An exhaust connection portion has a connection portion case and is provided with an exhaust port for emitting combustion gas delivered from the fan to outside of the water heater. The exhaust connection portion also has a drainage water discharge portion for discharging drainage water accumulated downstream of the fan in the path of the flow of combustion gas.

14 Claims, 13 Drawing Sheets

(51) Int. Cl.
*F23L 17/00* (2006.01)
*F23J 15/06* (2006.01)
*F23D 14/58* (2006.01)

(52) U.S. Cl.
CPC ............ *F24H 1/145* (2013.01); *Y02B 30/106* (2013.01); *Y02E 20/363* (2013.01)

(58) Field of Classification Search
USPC .............................. 122/13.3, 14.1, 18.1, 18.4
See application file for complete search history.

(56) References Cited

U.S. PATENT DOCUMENTS

| | | | |
|---|---|---|---|
| 9,404,670 B2 * | 8/2016 | Kimura | F24H 8/006 |
| 2009/0133642 A1 * | 5/2009 | Asakura | F22D 1/10 |
| | | | 122/32 |
| 2013/0264037 A1 * | 10/2013 | Otsubo | F28D 7/085 |
| | | | 165/157 |
| 2015/0176861 A1 * | 6/2015 | Karaki | F24H 8/006 |
| | | | 122/18.4 |
| 2015/0241086 A1 * | 8/2015 | Kameyama | F24H 8/00 |
| | | | 122/18.4 |
| 2015/0241088 A1 * | 8/2015 | Kameyama | F24H 8/00 |
| | | | 110/162 |
| 2016/0010891 A1 * | 1/2016 | Wada | F24H 8/006 |
| | | | 122/18.4 |
| 2016/0025375 A1 * | 1/2016 | Koda | F24H 8/006 |
| | | | 122/18.4 |
| 2016/0025376 A1 * | 1/2016 | Satoh | F23J 15/06 |
| | | | 122/18.4 |

FOREIGN PATENT DOCUMENTS

| | | |
|---|---|---|
| JP | S60-186617 A | 9/1985 |
| JP | 2012-141129 A | 7/2012 |

* cited by examiner

WATER HEATER

BACKGROUND OF THE INVENTION

Field of the Invention

The present invention relates to a water heater and particularly to a water heater of a latent heat recovery type capable of heating water by recovering latent heat of combustion gas.

Description of the Background Art

In replacement of an already placed tank water heater with an instantaneous water heater, there are locations where an already placed exhaust pipe (a B vent) cannot be removed from a point of view of maintaining appearance of buildings.

At such a location, a water heater can be replaced by leaving the already placed exhaust pipe and inserting an exhaust tube (a flexible exhaust tube) in the exhaust pipe. The exhaust tube should be smaller in diameter, because the exhaust tube cannot be placed in the exhaust pipe if the exhaust tube has a large outer diameter. In order to maintain a stable combustion state even when the exhaust tube is decreased in diameter, an exhaust suction and combustion type should be adopted for a water heater.

Such a water heater of an exhaust suction and combustion type is disclosed, for example, in Japanese Patent Laying-Open No. 60-186617. In the water heater described in this publication, a heat exchanger for recovering sensible heat, a heat exchanger for recovering latent heat, and a fan are arranged in this order on a downstream side in a flow of combustion gas produced in a burner. Namely, in the water heater of this type, the fan is arranged downstream of the heat exchanger for recovering latent heat in the flow of combustion gas.

In the above-described water heater of an exhaust suction and combustion type, since the fan is arranged downstream of the heat exchanger for recovering latent heat, drainage water produced in the heat exchanger is to be suctioned up to the fan. Even if the suctioned drainage water is delivered by air-blowing force of the fan to the exhaust tube, that is, to downstream of the fan in the path of the flow of combustion gas, drainage water may undergo condensation inside the exhaust tube and flow back to the fan. Also, rainwater may flow into the fan from the downstream side of the fan. Thereby, drainage water (including rainwater) accumulates in the fan, which may cause a problem that the air-blowing force of the fan is deteriorated.

SUMMARY OF THE INVENTION

The present invention has been made in light of the above-described problems. An object of the present invention is to provide a water heater capable of suppressing backflow (entry) of drainage water into a fan from the downstream side of the fan in the path of the flow of combustion gas.

A water heater of the present invention is a water heater of a latent heat recovery type capable of heating water by recovering latent heat of combustion gas, and includes a burner, a heat exchanger, a fan, and an exhaust connection portion. The burner includes a plurality of burner port portions and serves to generate combustion gas from an opening at an end of each of the plurality of burner port portions. The heat exchanger serves to heat water flowing through inside by heat exchange with combustion gas generated in the burner. The fan includes a fan case, an impeller housed within the fan case, a drive source attached to the fan case so as to drive the impeller, and a rotation shaft connecting the impeller and the drive source, and serves to suction combustion gas having passed through the heat exchanger and emit combustion gas to outside of the water heater. The exhaust connection portion has a connection portion case and is provided with an exhaust port for emitting combustion gas delivered from the fan to outside of the water heater. The exhaust connection portion has a drainage water discharge portion for discharging drainage water accumulated downstream of the fan in a path of a flow of combustion gas.

According to the water heater of the present invention, the exhaust connection portion is provided downstream of the fan in the path of the flow of combustion gas, and provided with the exhaust port for emitting combustion gas to the outside of the water heater. The exhaust connection portion has a drainage water discharge portion for discharging drainage water accumulated downstream of the fan in the path of the flow of combustion gas. Accordingly, the exhaust connection portion allows drainage water delivered from the fan to be discharged from the drainage water discharge portion. Therefore, it becomes possible to suppress backflow (entry) of drainage water into the fan from the downstream side of the fan in the path of the flow of combustion gas.

According to the above-described water heater, in plan view as seen from a shaft direction of the rotation shaft, a tongue portion extending between an internal space of the fan and an internal space of the exhaust connection portion is located at one end of a boundary between the internal space of the fan and the internal space of the exhaust connection portion, and a circumferential wall of the fan case and a circumferential wall of the connection portion case are linearly connected to each other at the other end of the boundary. Furthermore, the drainage water discharge portion is provided in a region surrounded by the boundary, the circumferential wall of the connection portion case and a tangent line of the exhaust port, and located along the circumferential wall of the connection portion case.

The airflow flowing from the fan side toward the exhaust connection portion and the airflow circling within the exhaust connection portion flow into the region surrounded by the boundary, the circumferential wall of the connection portion case and the tangent line of the exhaust port and located along the circumferential wall. Thus, the drainage water discharge portion is provided in this region, so that drainage water is more likely to flow into the drainage water discharge portion. Therefore, in the path of the flow of combustion gas, it becomes possible to more efficiently suppress backflow (entry) of drainage water into the fan from the downstream side of the fan in the path of the flow of combustion gas.

In the above-described water heater, the drainage water discharge portion is provided in a region surrounded by the boundary, the circumferential wall of the connection portion case and the tangent line of the exhaust port and located in the circumferential wall of the connection portion case.

The airflow flowing from the fan side toward the exhaust connection portion and the airflow circling within the exhaust connection portion flow into a region surrounded by the boundary, the circumferential wall of the connection portion case and the tangent line of the exhaust port and located in the circumferential wall of the connection portion case, as in the above description. Accordingly, also by providing a drainage water discharge portion in the circumferential wall of the exhaust connection portion of this region, it becomes possible to more efficiently suppress backflow (entry) of drainage water into the fan from the downstream side of the fan in the path of the flow of combustion gas, as in the above description.

In the above-described water heater, the connection portion case has a bottom wall provided with a recess. A height position of the recess is located close to a height position of a reference plane including the opening (which will be hereinafter simply referred to as a "reference plane") as compared with a height position of a bottom wall of the fan case in the boundary. The recess extends from the tongue portion toward the drainage water discharge portion. Thereby, drainage water within the exhaust connection portion can be readily discharged from the drainage water discharge portion.

In the above-described water heater, the recess is inclined such that the height position of the recess comes close to the reference plane from the tongue portion toward the drainage water discharge portion. Thereby, drainage water within the exhaust connection portion can be readily discharged from the drainage water discharge portion.

In the above-described water heater, the drainage water discharge portion is connected to the heat exchanger. Since the heat exchanger is located upstream of the fan in the path of the flow of combustion gas and also located near the fan, relatively large negative pressure occurs inside the path. Accordingly, drainage water within the exhaust connection portion can be suctioned into the drainage water discharge portion, so that drainage water can be more efficiently discharged.

In the above-described water heater, an exhaust box is provided between the heat exchanger and the fan, and the drainage water discharge portion is connected to the exhaust box. Since the exhaust box is located upstream of the fan in the path of the flow of combustion gas and also located near the fan, relatively large negative pressure occurs inside the path. Accordingly, drainage water within the exhaust connection portion can be suctioned into the drainage water discharge portion, so that drainage water can be more efficiently discharged.

In the above-described water heater, the fan case and the connection portion case are integrally formed. Accordingly, drainage water can be more smoothly discharged.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be hereinafter described with reference to the accompanying drawings.

[Water Heater]

First, the configuration of a water heater in one embodiment of the present invention will be described with reference to FIGS. 1 to 9.

Figure 1:
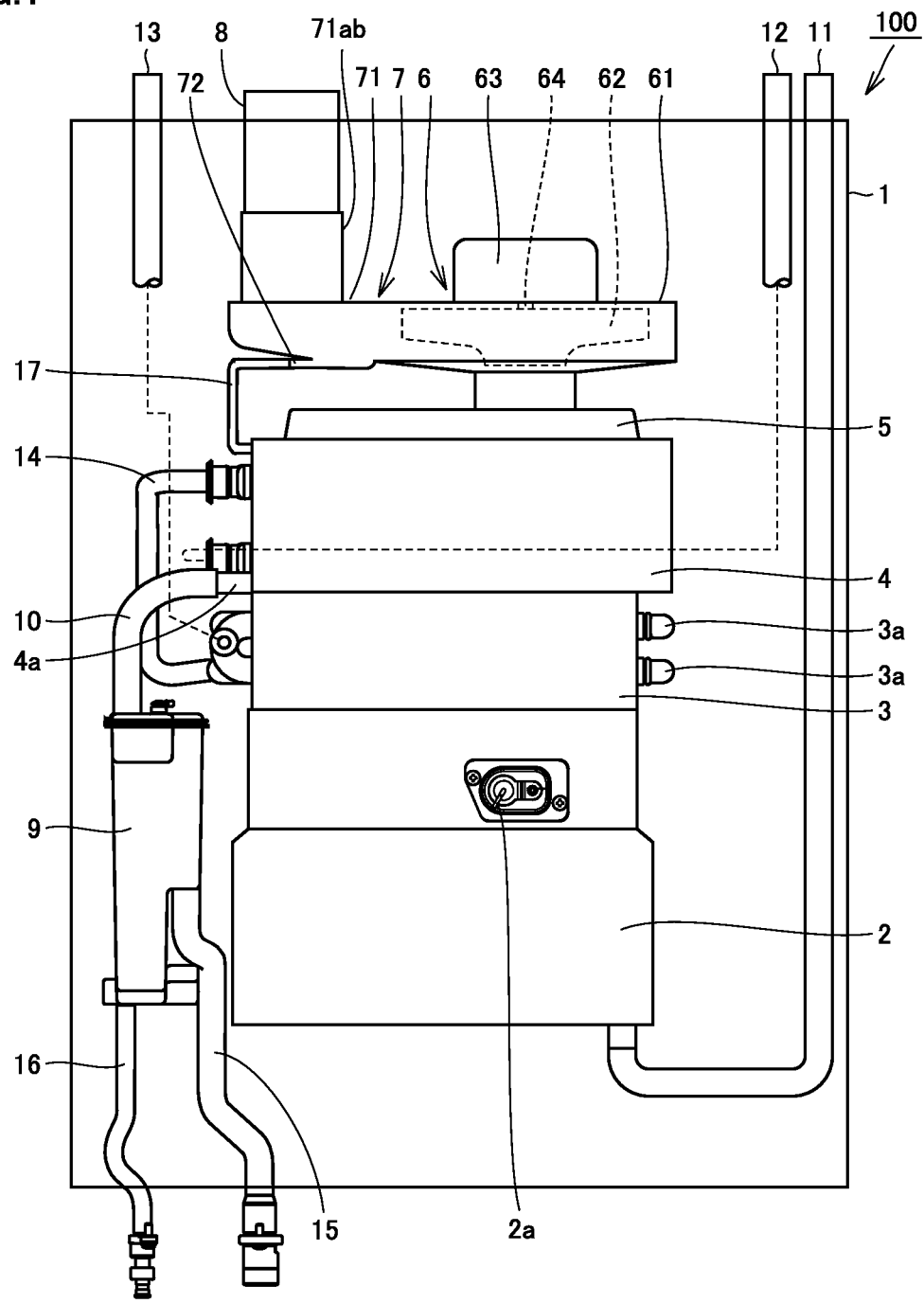
FIG. 1 is a front view schematically showing the configuration of a water heater in one embodiment of the present invention.
Figure 2:
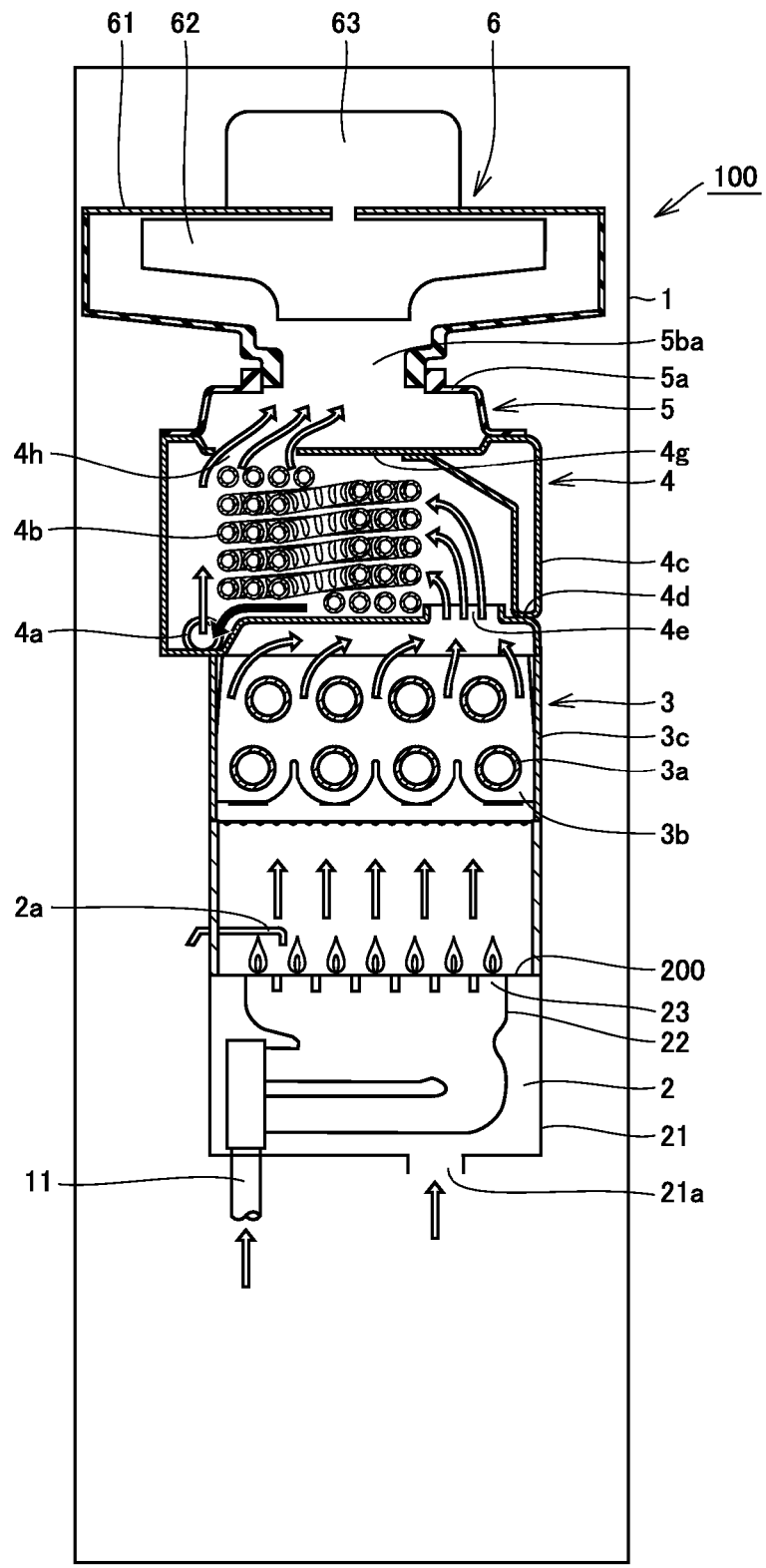
FIG. 2 is a partial cross-sectional side view schematically showing the configuration of the water heater shown in FIG. 1.

Referring mainly to FIGS. 1 and 2, a water heater 100 in the present embodiment is a water heater of a latent heat recovery type of an exhaust suction and combustion system. This water heater 100 mainly has a housing 1, a burner 2, a primary heat exchanger 3, a secondary heat exchanger 4, an exhaust box 5, a fan 6, an exhaust connection portion 7, a connection tube 8, a drainage water tank 9, and pipes 10 to 16.

Burner 2 serves to produce combustion gas by burning a fuel gas. A gas supply pipe 11 is connected to burner 2. This gas supply pipe 11 serves to supply a fuel gas to burner 2. A gas valve (not shown) implemented, for example, by an electromagnetic valve is attached to this gas supply pipe 11.

A spark plug 2a is arranged above burner 2. This spark plug 2a serves to ignite an air fuel mixture injected from burner 2 to thereby produce a flame, by generating sparks between the plug and a target (not shown) provided in burner 2. Burner 2 generates a quantity of heat by burning a fuel gas supplied from gas supply pipe 11 (which is called a combustion operation).

Figure 3:
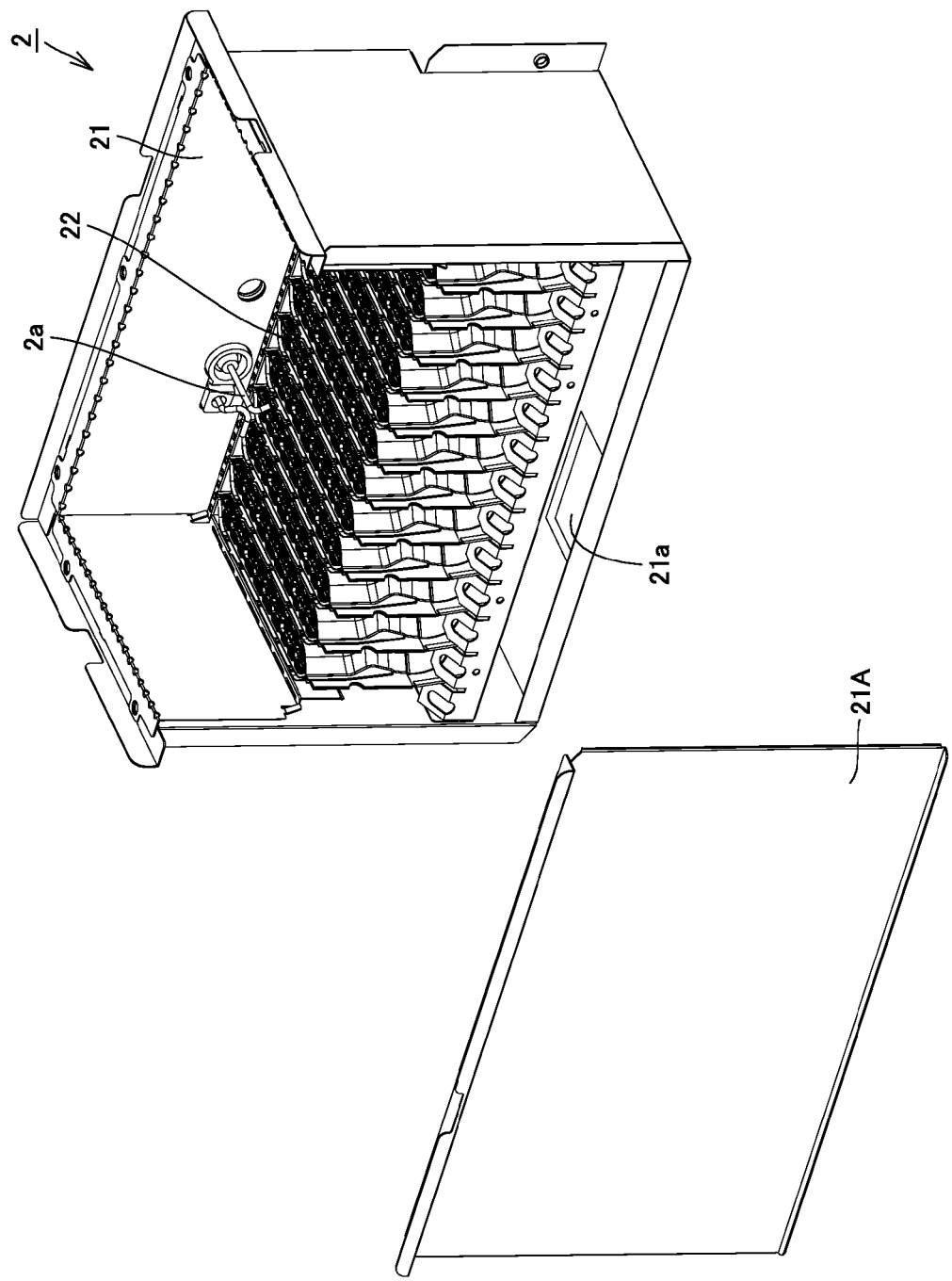
FIG. 3 is a perspective view schematically showing the configuration of a burner of the water heater shown in FIG. 1, which is an exploded perspective view showing the state where a wall surface 21A of a burner case is removed.
Figure 4:
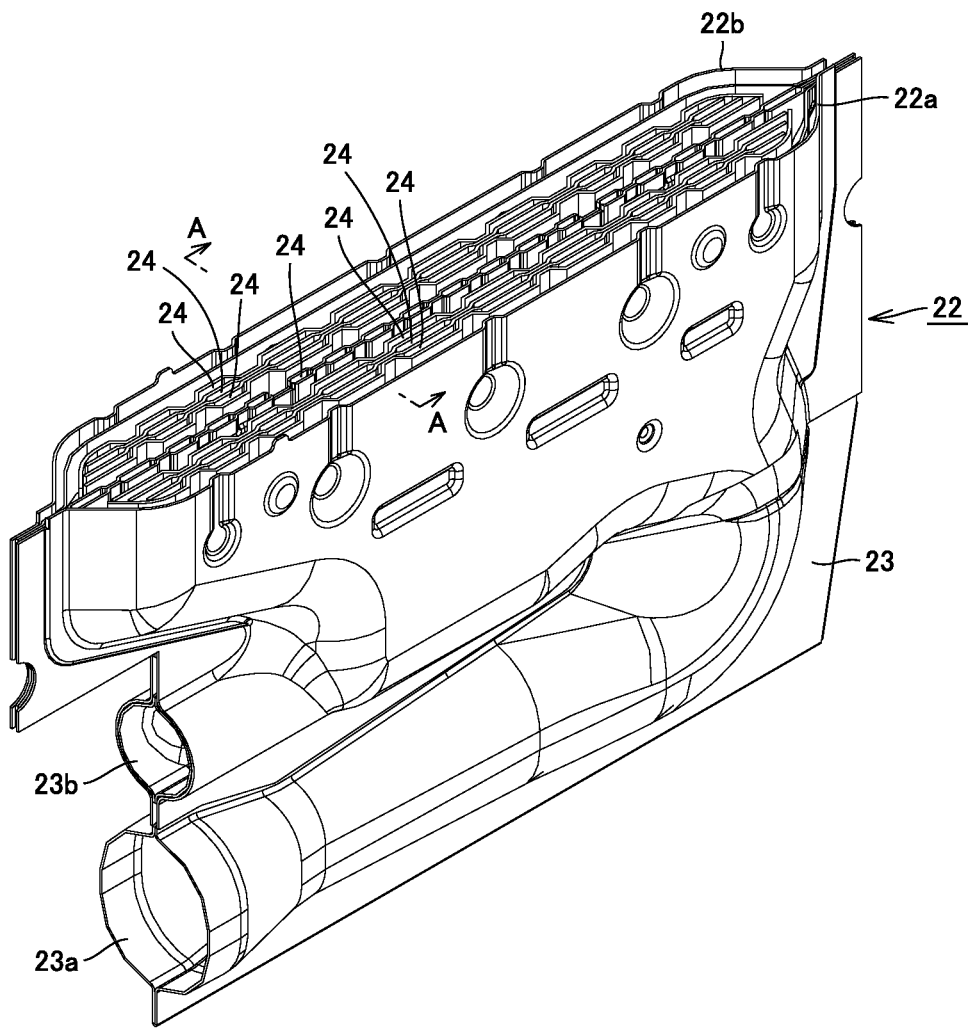
FIG. 4 is a perspective view schematically showing an example of the configuration of a combustion pipe used for the burner shown in FIG. 3.
Figure 5:
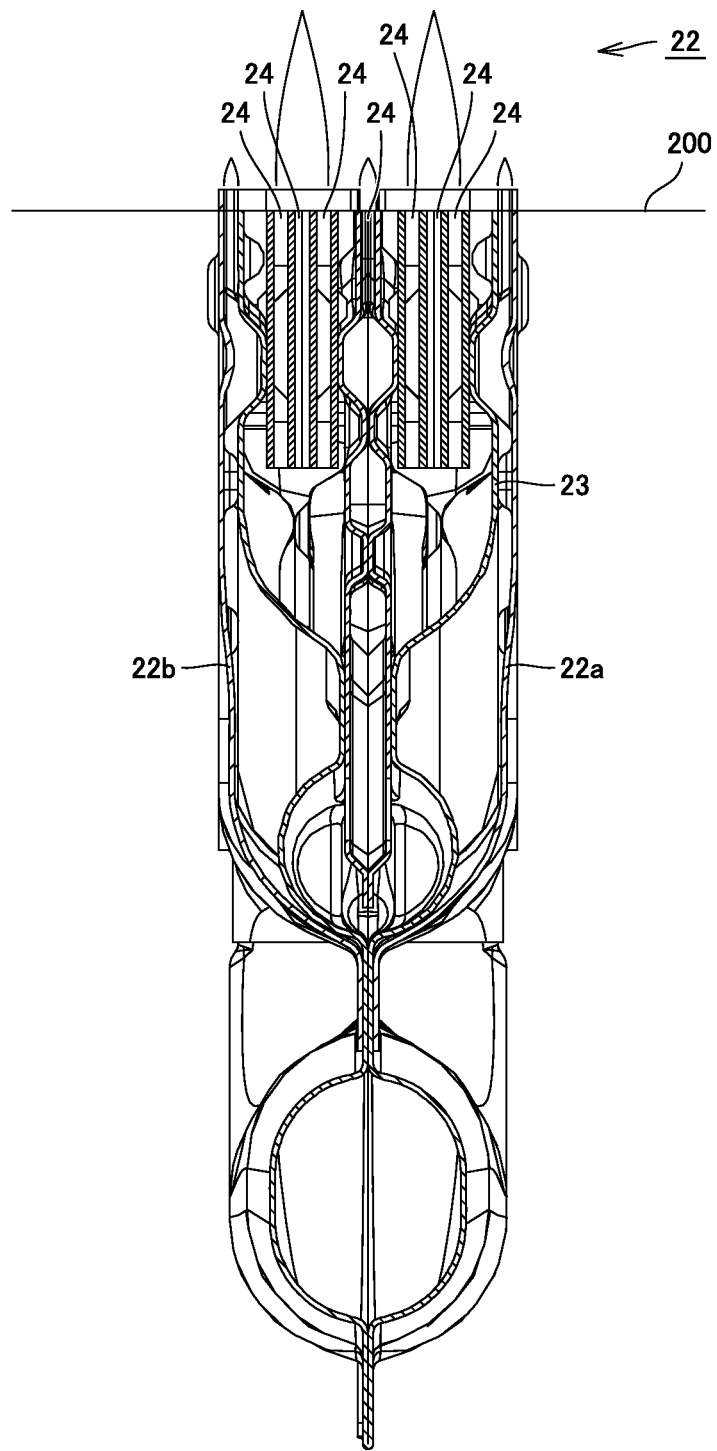
FIG. 5 is a schematic cross-sectional view taken along a line A-A in FIG. 4.

Referring mainly to FIGS. 3 to 5, burner 2 mainly has a burner case 21, a plurality of combustion tubes 22, and a spark plug 2a. Spark plug 2a attached to the wall surface of burner case 21 is disposed above the plurality of combustion tubes 22 (FIG. 3). Each of combustion tubes 22 mainly has a main body unit 23, a pair of combustion pipe units 22a and 22b disposed on the right and left sides, and a burner port portion 24 (FIG. 4). Burner port portion 24 contains a plurality of flame holes.

Main body unit 23 is provided with gas inlet ports 23a and 23b. Combustion pipe units 22a and 22b defined as one pair are attached to the right side and the left side, respectively, of main body unit 23. Burner port portion 24 is provided inside each of combustion pipe units 22a and 22b. In the present invention, a flat plane including openings of such plurality of burner port portions 24 is defined as a reference plane 200 (FIG. 5 and FIG. 2). It is preferable that this reference plane is a horizontal plane in the state where water heater 100 is placed.

Referring mainly to FIG. 2, primary heat exchanger 3 is a heat exchanger of a sensible heat recovery type. This primary heat exchanger 3 mainly has a plurality of plate-shaped fins 3b, a heat conduction pipe 3a penetrating the plurality of plate-shaped fins 3b, and a case 3c accommodating fins 3b and heat conduction pipe 3a. Primary heat exchanger 3 exchanges heat with combustion gas generated by burner 2, and specifically, serves to heat water which flows through heat conduction pipe 3a of primary heat exchanger 3 with the quantity of heat generated as a result of the combustion operation of burner 2.

Referring mainly to FIG. 2, secondary heat exchanger 4 is a heat exchanger of a latent heat recovery type. This secondary heat exchanger 4 is located downstream of primary heat exchanger 3 in a flow of combustion gas and connected in series with primary heat exchanger 3. Since water heater 100 according to the present embodiment thus has secondary heat exchanger 4 of a latent heat recovery type, it serves as a water heater of a latent heat recovery type.

Secondary heat exchanger 4 mainly has a drainage water discharge port 4a, heat conduction pipes 4b, a sidewall 4c, a bottom wall 4d, and an upper wall 4g. Heat conduction pipes 4b are layered as they are helically wound. Sidewall 4c, bottom wall 4d, and upper wall 4g are arranged to surround heat conduction pipes 4b.

In secondary heat exchanger 4, water flowing through heat conduction pipes 4b are pre-heated (heated) through heat exchange with combustion gas of which heat has been exchanged in primary heat exchanger 3. As a temperature of combustion gas is lowered to approximately 60° C. through this process, moisture contained in combustion gas is condensed so that latent heat can be obtained. In addition, latent heat is recovered in secondary heat exchanger 4 and moisture contained in combustion gas is condensed, thereby producing drainage water.

Bottom wall 4d serves as a partition between primary heat exchanger 3 and secondary heat exchanger 4, and also serves as an upper wall of primary heat exchanger 3. This bottom wall 4d is provided with an opening 4e that allows communication between a space where heat conduction pipe 3a of primary heat exchanger 3 is arranged and a space where heat conduction pipes 4b of secondary heat exchanger 4 are arranged. As shown with hollow arrows in FIG. 2, combustion gas can flow from primary heat exchanger 3 to secondary heat exchanger 4 through opening 4e. In this embodiment, for the sake of simplification, although one common component is employed for bottom wall 4d of secondary heat exchanger 4 and the upper wall of primary heat exchanger 3, an exhaust collection and guide member may be connected between primary heat exchanger 3 and secondary heat exchanger 4.

Furthermore, upper wall 4g is provided with an opening 4h, which allows communication between the space where heat conduction pipes 4b of secondary heat exchanger 4 are arranged and an internal space in exhaust box 5. As shown with hollow arrows in FIG. 2, combustion gas can flow from secondary heat exchanger 4 into the internal space in exhaust box 5 through opening 4h.

Drainage water discharge port 4a is provided in sidewall 4c or bottom wall 4d. This drainage water discharge port 4a opens at a lowest position in the space surrounded by side wall 4c, bottom wall 4d and upper wall 4g (at a lowermost position in the vertical direction in the state where the water heater is placed), which is lower than the lowermost end of heat conduction pipes 4b. Thus, drainage water produced in secondary heat exchanger 4 can be guided to drainage water discharge port 4a along bottom wall 4d and sidewall 4c as shown with a black arrow in FIG. 2.

Figure 6:
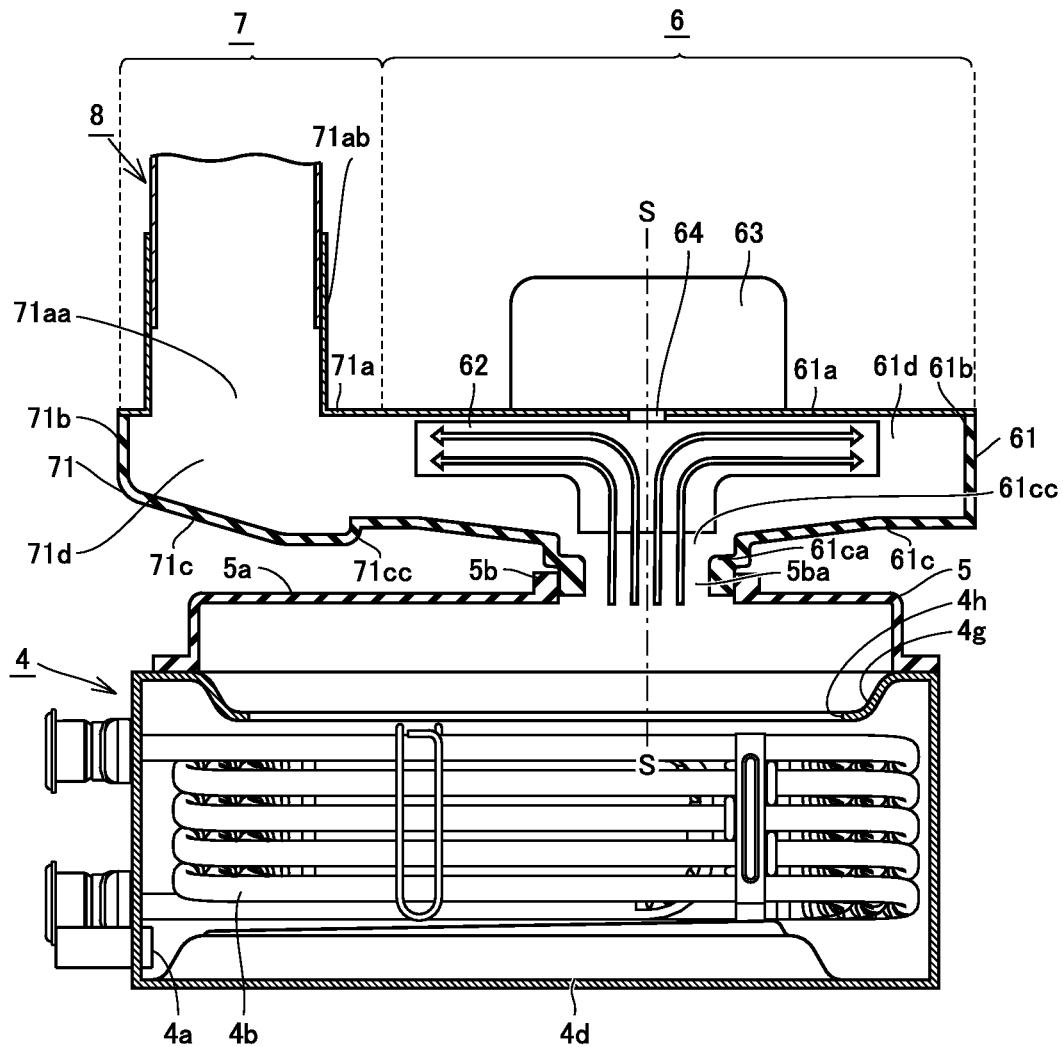
FIG. 6 is a partial cross-sectional view showing an enlarged view of a fan and a secondary heat exchanger for illustrating the configuration of the fan of the water heater shown in FIG. 1.

Referring mainly to FIGS. 2 and 6, exhaust box 5 forms a path for a flow of combustion gas between secondary heat exchanger 4 and fan 6. This exhaust box 5 can guide combustion gas of which heat has been exchanged in secondary heat exchanger 4 to fan 6. Exhaust box 5 is attached to secondary heat exchanger 4 and located downstream of secondary heat exchanger 4 in the flow of combustion gas.

Exhaust box 5 mainly has a box main body 5a and a fan connection portion 5b. The internal space of box main body 5a communicates through opening 4h of secondary heat exchanger 4 with the internal space in which heat conduction pipes 4b of secondary heat exchanger 4 are disposed. Fan connection portion 5b is provided so as to protrude from the top portion of box main body 5a. This fan connection portion 5b has a cylindrical shape, for example, and has an internal space 5ba that communicates with the internal space of box main body 5a.

Referring mainly to FIG. 6, fan 6 serves to emit combustion gas (of which heat has been exchanged in secondary heat exchanger 4) which has passed through secondary heat exchanger 4 to the outside of water heater 100 by suctioning combustion gas. Fan 6 is connected at its one end to exhaust connection portion 7.

Fan 6 is located downstream of exhaust box 5 and secondary heat exchanger 4 in the flow of combustion gas. Namely, in water heater 100, burner 2, primary heat exchanger 3, secondary heat exchanger 4, exhaust box 5, and fan 6 are arranged in this order from upstream to downstream in the flow of combustion gas produced in burner 2. Since combustion gas is suctioned and exhausted by means of fan 6 as above in this arrangement, water heater 100 in the present embodiment is a water heater of an exhaust suction and combustion type.

Fan 6 mainly has a fan case 61, an impeller 62, a drive source 63, and a rotation shaft 64. Fan case 61 is attached to fan connection portion 5b of exhaust box 5 so as to allow communication between the internal space of fan case 61 and the internal space of fan connection portion 5b. Thereby, combustion gas can be suctioned from box main body 5a of exhaust box 5 through fan connection portion 5b into fan case 61 as indicated by hollow arrows in FIG. 2.

Referring mainly to FIG. 6, impeller 62 is housed within fan case 61. This impeller 62 is connected to drive source 63 through rotation shaft 64. Thereby, impeller 62 is supplied with driving force from drive source 63 so as to be rotatable about rotation shaft 64. By rotation of impeller 62, combustion gas within exhaust box 5 is suctioned from the inner circumferential side of impeller 62 and emitted toward the outer circumferential side of the impeller. An alternate long and short dash line S in FIG. 6 shows the shaft direction of rotation shaft 64.

Figure 7:
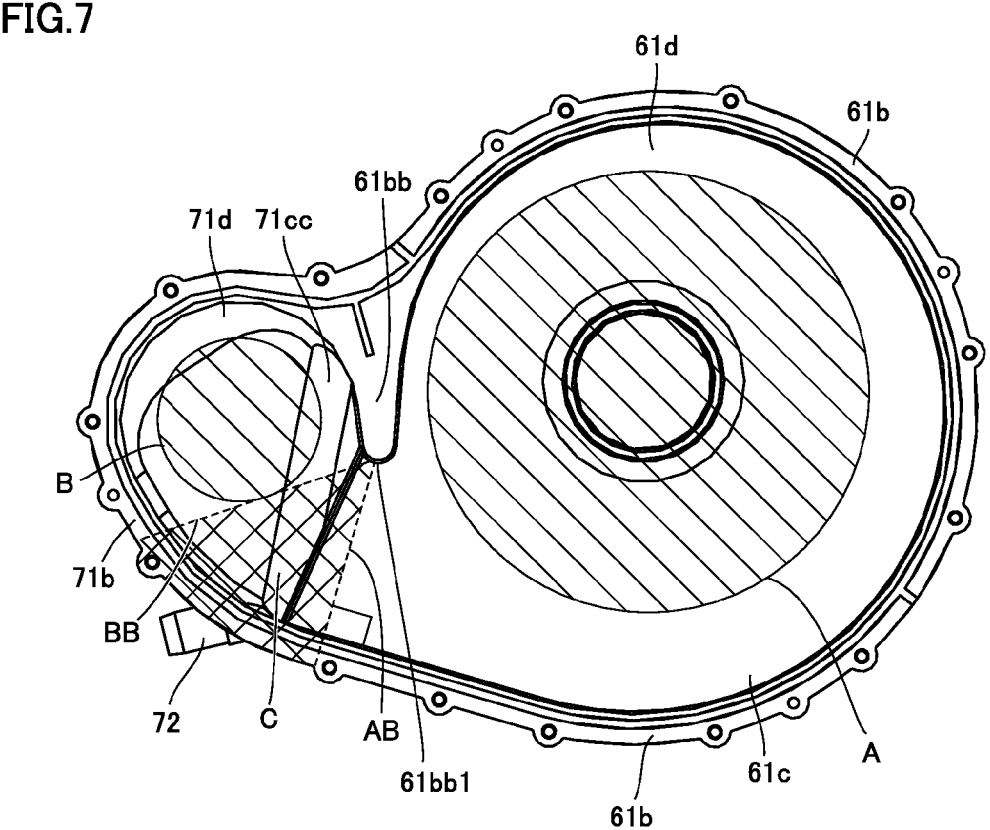
FIG. 7 is a top plan view schematically showing a fan case and a connection portion case of the water heater shown in FIG. 1, in plan view as seen from the shaft direction of a rotation shaft of the fan.
Figure 8:
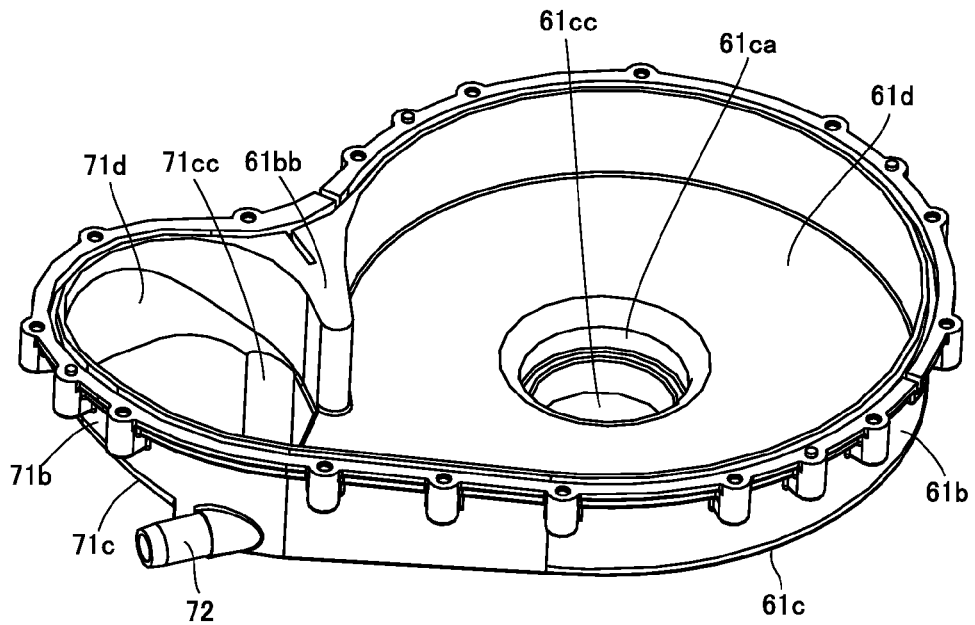
FIG. 8 is a perspective view schematically showing the fan case and the connection portion case shown in FIG. 7.
Figure 9:
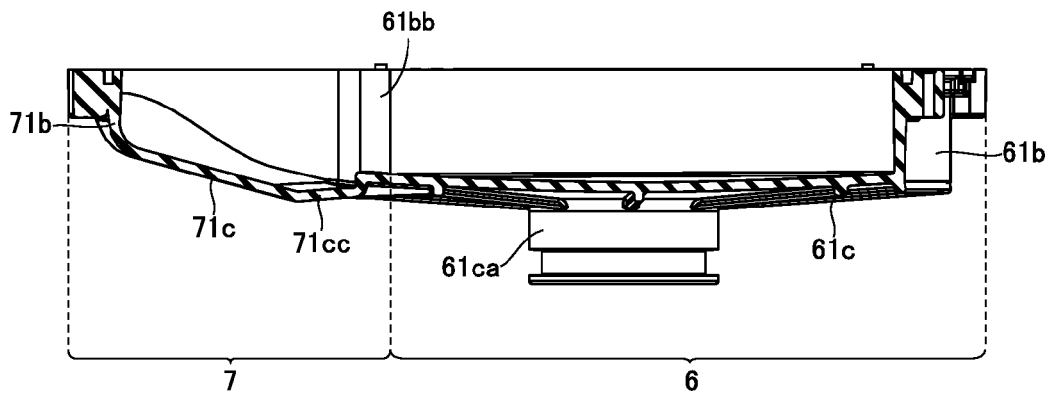
FIG. 9 is a cross-sectional view schematically showing the fan case and the connection portion case shown in FIG. 7.

Referring mainly to FIGS. 6, 7 and 8, fan case 61 mainly has a ceiling wall 61a, a circumferential wall 61b, and a bottom wall 61c. Ceiling wall 61a is penetrated by rotation shaft 64 that connects impeller 62 housed within fan case 61 and drive source 63 provided outside fan case 61. Circumferential wall 61b is arranged so as to surround the outer circumference of impeller 62 housed within fan case 61. In FIG. 7, a region A within fan case 61 in which impeller 62 is arranged is shown by hatched lines.

Bottom wall 61c of fan case 61 is provided with an opening 61cc, which allows communication between an internal space 61d of fan case 61 (the internal space of fan 6) and an internal space 5ba of fan connection portion 5b. Bottom wall 61c has, for example, a cylindrical protruding portion 61ca so as to be readily connected to fan connection portion 5b.

Referring mainly to FIGS. 2, 6, 7, and 8, exhaust connection portion 7 serves to guide combustion gas, which has been delivered from fan 6, to connection tube 8, and is located downstream of fan 6 in the path of the flow of combustion gas. Specifically, in water heater 100, burner 2, primary heat exchanger 3, secondary heat exchanger 4, exhaust box 5, fan 6, exhaust connection portion 7, and connection tube 8 are arranged in this order from upstream to downstream in the flow of combustion gas produced in burner 2.

Exhaust connection portion 7 has a connection portion case 71. Connection portion case 71 mainly has a ceiling wall 71a, a circumferential wall 71b, and a bottom wall 71c, in which an internal space 71d of connection portion case 71 (the internal space of exhaust connection portion 7) and an internal space 61d of fan case 61 (the internal space of fan 6) communicate with each other.

Ceiling wall 71a is provided with an exhaust port 71aa through which combustion gas delivered from fan 6 is emitted to the outside of water heater 100. Around exhaust port 71aa, a tubular exhaust connection pipe 71ab is provided so as to be readily connected to connection tube 8. Circumferential wall 71b is arranged so as to surround a projection area B of exhaust port 71aa (a hatched area within connection portion case 71 in FIG. 7) in plan view of exhaust connection portion 7 as seen from the shaft direction of rotation shaft 64d of fan 6 (FIG. 7).

Exhaust connection portion 7 further has a drainage water discharge portion 72. Drainage water discharge portion 72 serves to discharge drainage water accumulated downstream of fan 6 in the path of the flow of combustion gas. Drainage water discharge portion 72 is connected to secondary heat exchanger 4 via a connecting pipe 17 (see FIG. 2). Thereby, the internal space of exhaust connection portion 7 and the internal space of secondary heat exchanger 4 communicate with each other through drainage water discharge portion 72 and connecting pipe 17.

In the present embodiment, fan case 61 and connection portion case 71 are integrally formed. Specifically, circumferential wall 61b and bottom wall 61c of fan case 61 and circumferential wall 71b and bottom wall 71c of connection portion case 71 are integrally formed. Also, ceiling wall 61a of fan case 61 and bottom wall 71c of connection portion case 71 are integrally formed.

In this case, the boundary between fan 6 and exhaust connection portion 7 is shown by a dotted line AB in the plan view shown in FIG. 7. This dotted line AB is a straight line that is orthogonal to the wall surface facing tongue portion 61bb and passes through an end 61bb1 of tongue portion 61bb. A portion on the right side of this dotted line AB as a boundary in the figure corresponds to a portion substantially functioning as a fan.

The portion substantially functioning as a fan is referred to as a "fan 6" in the present specification. Also, the portion located downstream of "fan 6" and adjacent to "fan 6" along dotted line AB as a boundary is referred to as an "exhaust connection portion 7".

In other words, fan 6 and exhaust connection portion 7 are connected to each other at boundary AB. Accordingly, internal space 61d of fan 6 (internal space 61d of fan case 61) and internal space 71d of exhaust connection portion 7 (internal space 71d of connection portion case 71) are connected to each other at boundary AB. Furthermore, tongue portion 61bb extends between circumferential wall 61b of fan case 61 provided in fan 6 and circumferential wall 71b of connection portion case 71 provided in exhaust connection portion 7.

Drainage water discharge portion 72 is provided in a region C surrounded by boundary AB, circumferential wall 71b of connection portion case 71, and a tangent line BB of exhaust port 71aa and is located at a position along circumferential wall 71b. In this case, "region C surrounded by boundary AB, circumferential wall 71b of connection portion case 71, and a tangent line BB of exhaust port 71aa" means exhaust connection portion 7 surrounded by: tangent line BB extending from end 61bb1 of tongue portion 61bb so as to come in contact with the outer edge of projection area B of exhaust port 71aa; boundary AB; and circumferential wall 71b located between boundary AB and tangent line BB (that is, including circumferential wall 71b). This corresponds to region C shown by cross-hatched lines in FIG. 7. The "position along circumferential wall 71b" means a position including circumferential wall 71b and bottom wall 71c that is located on the circumferential wall 71b side relative to tongue portion 61bb. FIG. 7 shows the state where drainage water discharge portion 72 is located in circumferential wall 71b.

Referring to FIGS. 2, 7, 8, and 9, bottom wall 71c of connection portion case 71 is provided with a recess 71cc. The height position of recess 71cc is located closer to a reference plane 200 (FIG. 5) as compared with the height position of bottom wall 61c of fan case 61 in boundary AB. Namely, in the state where water heater 100 is installed, the height position of the upper surface of bottom wall 71c forming recess 71cc is located lower in the vertical direction than the height position of the upper surface of bottom wall 61c of fan case 61 in boundary AB. Furthermore, recess 71cc extends from tongue portion 61*bb* toward drainage water discharge portion 72 and is inclined from tongue portion 61*bb* toward drainage water discharge portion 72 such that the height position of the upper surface of bottom wall 71*c* comes close to reference plane 200. Specifically, in the state where water heater 100 is installed, recess 71*cc* is configured so as to be inclined downward in the vertical direction from tongue portion 61*bb* toward drainage water discharge portion 72.

Referring mainly to FIGS. 1 and 6, connection tube 8 has one end arranged on the outside of water heater 100 and the other end connected to exhaust connection pipe 71*ab*. Accordingly, combustion gas emitted by impeller 62 of fan 6 to the outer circumferential side can be emitted to the outside of water heater 100 through connection tube 8. The one end of connection tube 8 is connected, for example, to an exhaust tube (not shown) inserted into the already-placed exhaust pipe.

Referring mainly to FIG. 2, combustion gas produced by burner 2 as described above is suctioned by fan 6 with rotation of impeller 62 as above, so that combustion gas can reach fan 6 after passage through primary heat exchanger 3, secondary heat exchanger 4, and exhaust box 5 in this order as shown with the hollow arrows in the figure and can be emitted to the outside of water heater 100.

Referring mainly to FIG. 1, drainage water tank 9 serves to store drainage water produced in secondary heat exchanger 4. This drainage water tank 9 and drainage water discharge port 4*a* of secondary heat exchanger 4 are connected through a drainage water discharge pipe 10. The acid drainage water stored in drainage water tank 9 is for example temporarily stored in the internal space of drainage water tank 9, and then, usually discharged through a drainage water discharge pipe 15 to the outside of water heater 100.

It is to be noted that the lower portion of drainage water tank 9 is connected to a drainage water outlet pipe 16 separately from drainage water discharge pipe 15. This drainage water outlet pipe 16 (usually closed) is designed to be opened during maintenance or the like, thereby allowing discharge of drainage water within drainage water tank 9 that cannot be discharged through drainage water discharge pipe 15. An internal space in drainage water tank 9 may be filled with a neutralization agent (not shown) for neutralizing acid drainage water.

Referring mainly to FIG. 1, a gas supply pipe 11 is connected to burner 2. A water supply pipe 12 is connected to heat conduction pipes 4*b* of secondary heat exchanger 4 (see FIG. 2) and a hot water delivery pipe 13 is connected to heat conduction pipe 3*a* of primary heat exchanger 3 (see FIG. 2). Heat conduction pipe 3*a* of primary heat exchanger 3 and heat conduction pipes 4*b* of secondary heat exchanger 4 are connected to each other through a connection pipe 14. Each of gas supply pipe 11, water supply pipe 12, and hot water delivery pipe 13 leads to the outside, for example, in a top portion of water heater 100.

Then, the functions and effects of the water heater of the present embodiment will be hereinafter described.

In the above-described water heater of an exhaust suction and combustion type, the fan is arranged downstream of the heat exchanger for recovering latent heat, so that drainage water is to be suctioned up by the fan. Even if the suctioned drainage water is once delivered by the air-blowing force of the fan to the exhaust tube, that is, to the downstream side of the fan in the path of the flow of combustion gas, this drainage water may undergo condensation within the exhaust tube and flow back toward the fan again.

Figure 10:
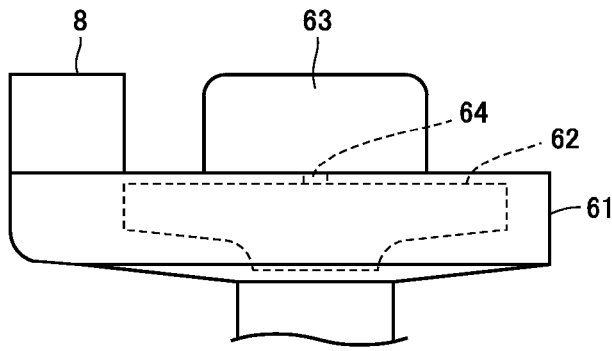
FIG. 10 is a schematic diagram for illustrating that drainage water accumulated downstream of the fan in the path of the flow of combustion gas is more likely to come in contact with the fan in a water heater of Comparative Example.

For example, the following is the case where connection tube 8 is directly connected to fan 6 as shown in FIG. 10. Specifically, in plan view of fan 6 as seen from the shaft direction of rotation shaft 64, a part of the projection area of the opening of connection tube 8 tends to overlap with the area in which impeller 62 is arranged, or the projection area of the opening of connection tube 8 tends to be located too close to the area in which impeller 62 is arranged. In this case, when drainage water that has undergone condensation within connection tube 8 falls in the projection area, drainage water may fall onto impeller 62 or may bounce back from bottom wall 61*c* of fan case 61 and hit impeller 62.

Since drainage water is acid as described above, impeller 62 may corrode when drainage water comes in contact with impeller 62. Furthermore, when drainage water accumulates within fan case 61, impeller 62 is to sink in drainage water so that the air-blowing capability of fan 6 is deteriorated. Furthermore, rainwater may enter through the upper end of connection tube 8, and accumulate within fan case 61.

In contrast, water heater 100 of the present embodiment has exhaust connection portion 7 between fan 6 and connection tube 8. Accordingly, it becomes possible to suppress that the projection area of the opening (that is, exhaust port 71*aa*) of connection tube 8 is located too close to the area in which impeller 62 is arranged. Furthermore, exhaust connection portion 7 has drainage water discharge portion 72 through which drainage water accumulated downstream of fan 6 in the path of the flow of combustion gas is discharged.

Accordingly, drainage water that has been suctioned up by fan 6 from secondary heat exchanger 4 and delivered from fan 6 to exhaust connection portion 7 can be discharged from drainage water discharge portion 72. Consequently, since drainage water delivered to the downstream of fan 6 in the path of the flow of combustion gas is suppressed from flowing back to fan 6, deterioration of the air-blowing capability of fan 6 and corrosion of impeller 62 can be suppressed. Furthermore, rainwater that has flown through the upper end of connection tube 8 into exhaust connection portion 7 can be suppressed from flowing into fan 6.

Furthermore, in plan view as seen from the shaft direction of rotation shaft 64, drainage water discharge portion 72 is provided in region C surrounded by boundary AB, tongue portion 61*bb* and the projection area of exhaust port 71*aa*, and is located along circumferential wall 71*b*. This further facilitates discharge of drainage water, the reason of which will be described with reference to FIG. 11.

Figure 11:
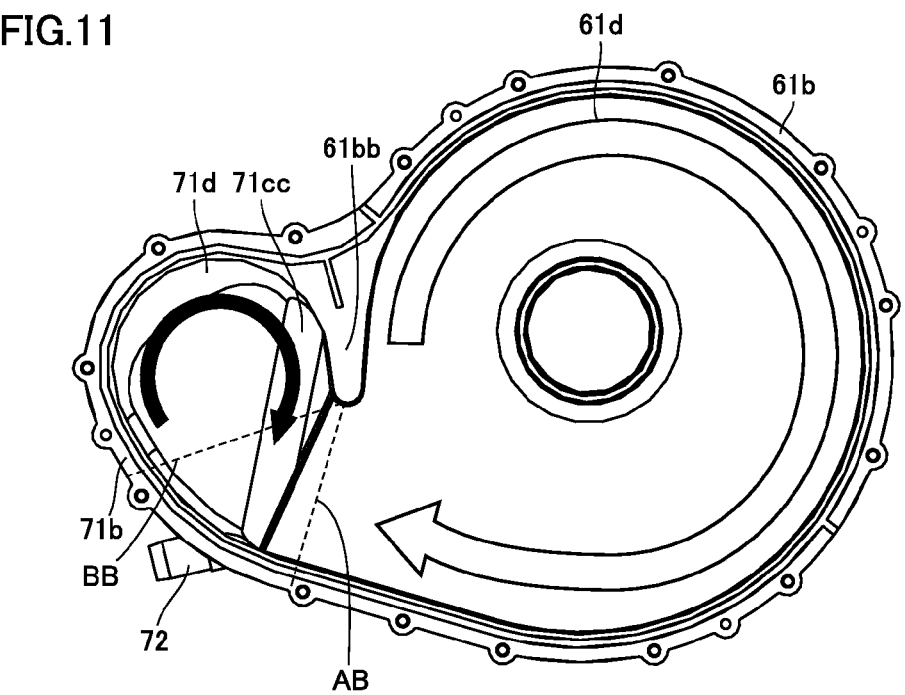
FIG. 11 is a schematic diagram for illustrating airflow produced in each of an internal space of the fan case and an internal space of the connection portion case shown in FIG. 1.

Referring to FIG. 11, when impeller 62 rotates, airflow (indicated by a hollow arrow in the figure) occurs in internal space 61*d* of fan case 61, which is delivered toward exhaust connection portion 7 while circling from circumferential wall 61*b* on the tongue portion 611*bb* side along circumferential wall 61*b*. On the other hand, airflow (indicated by a black arrow in the figure) occurs in internal space 71*d* of exhaust connection portion 7, which rises within connection tube 8 while circling from circumferential wall 61*b* on the boundary AB side along circumferential wall 71*b* by the air-blow pressure of impeller 62.

If drainage water discharge portion 72 is provided within projection area B of exhaust port 71*aa*, the flow of drainage water toward drainage water discharge portion 72 may be suppressed by the airflow that rises from bottom wall 71*c* toward exhaust port 71*aa*.

In contrast, in the case where drainage water discharge portion 72 is not located in projection area B of exhaust port 71*aa*, the above-described rising airflow is less likely to exert an influence, so that drainage water can be readily discharged from drainage water discharge portion 72.

Furthermore, as shown in FIG. 11, the airflow flowing from fan 6 (indicated by a hollow arrow in the figure) and the airflow occurring within exhaust connection portion 7 (indicated by a black arrow in the figure) are more likely to concentrate at a position of region C that extends along circumferential wall 71*b*. Accordingly, if drainage water discharge portion 72 is provided particularly at the position of region C that extends along circumferential wall 71*b*, drainage water is readily guided to drainage water discharge portion 72. Consequently, drainage water can be more efficiently discharged.

Furthermore, it is preferable that the direction in which the internal space of drainage water discharge portion 72 extends corresponds to the direction from boundary AB toward tangent line BB, as shown in FIGS. 7, 8 and 11. Thereby, the direction in which the internal space of drainage water discharge portion 72 extends is aligned to the direction of the airflow that reaches drainage water discharge portion 72, with the result that drainage water can be more smoothly discharged.

It is to be noted that the "direction in which the internal space of drainage water discharge portion 72 extends" means the direction extending in the internal space of drainage water discharge portion 72 from the side adjacent to internal space 71*d* of exhaust connection portion 7 toward the side opposite thereto. Specifically, it is preferable that the angle formed by the direction of circumferential wall 71*b* extending from boundary AB toward tangent line BB and the direction in which the internal space of drainage water discharge portion 72 extends is equal to or less than 90°.

In the present embodiment, drainage water discharge portion 72 is provided in circumferential wall 71*b* of region C. Thereby, the end of drainage water discharge portion 72 can be located at a relatively sufficient distance from other components of water heater 100. Accordingly, the operation of attaching connecting pipe 17 to drainage water discharge portion 72 can be readily carried out.

Furthermore, in water heater 100 of the present embodiment, recess 71*cc* is provided in bottom wall 71*c* of connection portion case 71. Also, in the state where water heater 100 is installed, the height position of the upper surface of bottom wall 71*c* forming recess 71*cc* is lower in the vertical direction than the height position of the upper surface of bottom wall 61*c* of fan case 61 in boundary AB.

Hereinafter described will be an assumption that, in the state where water heater 100 is installed while connection portion case 71 does not have recess 71*cc*, the height position of the upper surface of bottom wall 71*c* of connection portion case 71 is higher in the vertical direction than the height position of the upper surface of bottom wall 61*c* of fan case 61 in boundary AB. In this case, after fan 6 is stopped, drainage water having flown from fan case 61 beyond boundary AB into exhaust connection portion 7 by means of the air-blowing force of fan 6 may flow from above to below in the vertical direction, that is, from exhaust connection portion 7 toward fan 6.

In contrast, in the state where water heater 100 is installed, the height position of the upper surface of bottom wall 7*c* forming recess 71*cc* is lower in the vertical direction than the height position of the upper surface of bottom wall 61*c* of fan case 61 in boundary AB. Accordingly, drainage water having flown from fan 6 beyond boundary AB into exhaust connection portion 7 by means of the air-blowing force of fan 6 can still be guided by gravity into recess 71*cc* in bottom wall 71*c* of connection portion case 71 even after fan 6 is stopped, that is, even after the air-blowing force of fan 6 is stopped. Therefore, even after fan 6 is stopped, drainage water accumulated downstream of fan 6 in the path of the flow of combustion gas can be suppressed from flowing toward fan case 61, and also, drainage water can be guided to drainage water discharge portion 72.

Furthermore, in the state where water heater 100 is installed, recess 71*cc* is formed so as to be inclined downward in the vertical direction from tongue portion 61*bb* toward drainage water discharge portion 72. Thereby, even after fan 6 is stopped, drainage water within exhaust connection portion 7 can be readily guided along the inclination to drainage water discharge portion 72 located downward in the vertical direction. Therefore, drainage water can be further readily discharged.

In the case where recess 71*cc* is formed so as to be inclined downward in the vertical direction from tongue portion 61*bb* toward drainage water discharge portion 72, the height position of the upper surface of recess 71*cc* on the tongue portion 61*bb* side is located closer to the height position of the upper surface of bottom wall 61*c* of fan case 61 in boundary AB as compared with the height position of the upper surface of recess 71*cc* on the drainage water discharge portion 72 side. Namely, the height difference between the upper surface of recess 71*cc* on the tongue portion 61*bb* side and the upper surface of bottom wall 61*c* of fan case 61 in boundary AB may not be able to be sufficiently provided. In this case, it is feared that drainage water that flows toward drainage water discharge portion 72 while circling within internal space 71*d* of exhaust connection portion 7 may flow into fan 6 beyond boundary AB on the tongue portion 61*bb* side.

Thus, as shown in FIGS. 7 and 8, it is preferable that an area of recess 71*cc* on the tongue portion 61*bb* side that is located on the boundary AB side is inclined in a multistage manner (two stages in FIGS. 7 and 8) so as to be steeply inclined. Thereby, after fan 6 is stopped, drainage water within exhaust connection portion 7 can be guided to drainage water discharge portion 72. Also, during driving of fan 6, drainage water circling within exhaust connection portion 7 can be suppressed from flowing back toward fan 6 beyond boundary AB on the tongue portion 61*bb* side.

Furthermore, drainage water discharge portion 72 is connected to secondary heat exchanger 4 through connecting pipe 17. Since secondary heat exchanger 4 is located upstream of fan 6 in the path of the flow of combustion gas and also located near fan 6, relatively large negative pressure occurs in the path. Accordingly, drainage water within exhaust connection portion 7 can be efficiently suctioned into drainage water discharge portion 72. Thereby, drainage water accumulated downstream of fan 6 in the path of the flow of combustion gas can be more efficiently discharged from the inside of exhaust connection portion 7.

Furthermore, drainage water discharge portion 72 may be connected to exhaust box 5 through connecting pipe 17. Since the exhaust box is also located upstream of fan 6, drainage water accumulated downstream of fan 6 in the path of the flow of combustion gas can be more efficiently discharged from the inside of exhaust connection portion 7.

Furthermore, in water heater 100, fan case 61 and connection portion case 71 are integrally formed. This eliminates the need to provide a connection structure for connecting these cases, so that each of the ceiling wall, the circumferential wall and the bottom wall can be configured to have a smooth surface. Accordingly, drainage water can be prevented from adhering to the connection structure and accumulating therein. Therefore, drainage water can be more smoothly discharged.

Figure 12:
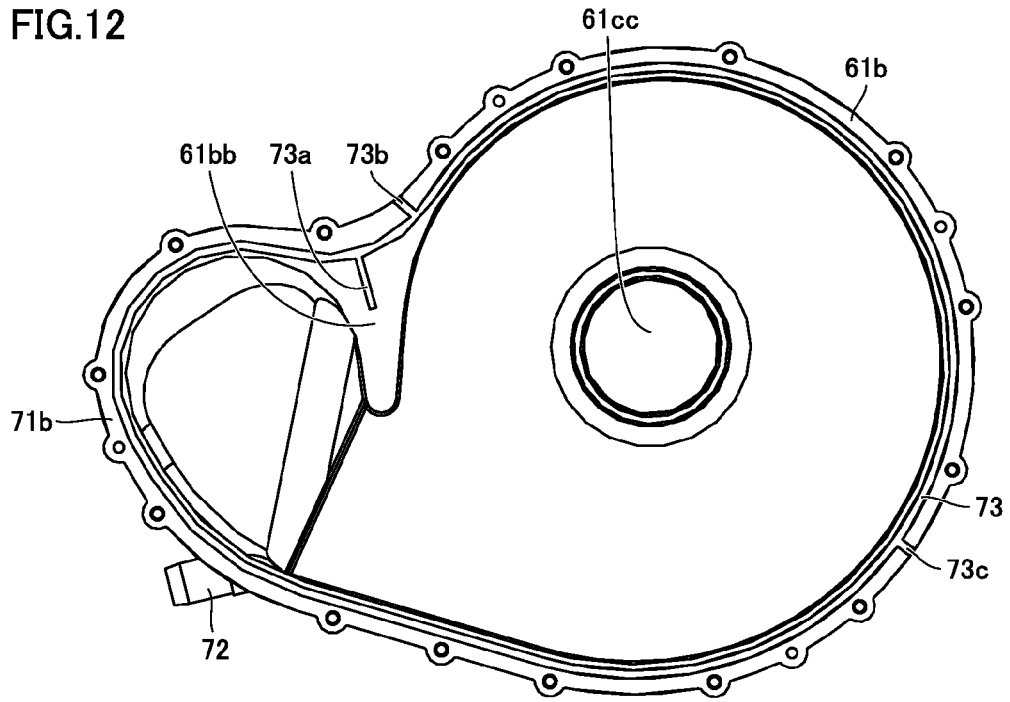
FIG. 12 is a schematic diagram for illustrating an annular groove portion provided in an upper surface of each of a circumferential wall of the fan case and a circumferential wall of the connection portion case shown in FIG. 1.

Also referring to FIG. 12, it is preferable that an annular groove portion 73 for arranging annular members such as a gasket and an O ring is provided in the upper surface of each of circumferential wall 61b of fan case 61 and circumferential wall 71b of connection portion case 71 in water heater 100. Thereby, circumferential wall 61b and ceiling wall 61a of fan case 61 can be brought into close contact with each other. Furthermore, ceiling wall 71a and circumferential wall 71b of connection portion case 71 can be brought into close contact with each other. Therefore, combustion gas delivered from fan 6 can be suppressed from leaking through a gap.

Particularly, as shown in FIG. 12, it is preferable that annular groove portion 73 is provided with a branch portion 73a that extends toward the inner circumferential side along the direction in which tongue portion 61bb extends. Thereby, it becomes possible to suppress generation of a path that extends from internal space 61d of fan case 61 through the upper surface of tongue portion 61bb toward internal space 71d of exhaust connection portion 7. In the case where such a path is generated and combustion gas flows through this path, the air-blowing efficiency of fan 6 is significantly deteriorated.

Furthermore, it is preferable that annular groove portion 73 is provided with at least one of branch portions 73b and 73c extending toward the outer circumferential side that is opposite to the direction in which branch portion 73a extends.

In the case where annular groove portion 73 does not have branch portions 73b and 73c, it cannot be visually checked whether an annular member is arranged or not in groove portion 73 after ceiling wall 61a of fan case 61 and ceiling wall 71a of connection portion case 71 are arranged on the upper surfaces of circumferential wall 61b of fan case 61 and circumferential wall 71b of connection portion case 71, respectively.

In contrast, in the case where annular groove portion 73 has branch portion 73b and/or branch portion 73c, an annular member having a shape corresponding to that of this groove portion 73 is arranged on groove portion 73, thereby allowing visual observation from outside so as to check whether an annular member has been arranged or not in groove portion 73 even after ceiling wall 61a of fan case 61 and ceiling wall 71a of connection portion case 71 were arranged.

Particularly in the case where annular groove portion 73 has each of branch portions 73b and 73c, an annular member having a shape corresponding to that of this groove portion 73 is arranged on groove portion 73, thereby allowing visual observation from the different direction so as to check whether an annular member has been arranged or not in groove portion 73 after ceiling wall 61a of fan case 61 and ceiling wall 71a of connection portion case 71 were arranged.

Furthermore, if there are one branch portion 73a extending toward the inner circumferential side of groove portion 73 and two branch portions 73b and 73c extending toward the outer circumferential side of groove portion 73, the annular member can also be shaped to have one branch portion extending toward the inner circumferential side and two branch portions extending toward the outer circumferential side. Accordingly, a mix-up between the outer circumferential side and the inner circumferential side of the annular member can be prevented.

Since water heater 100 of an exhaust suction and combustion type is employed as described above in the present embodiment, a combustion operation by burner 2 can be stabilized as compared with a water heater of what is called a forced exhaust type even though connection tube 8 is decreased in diameter, which will be described below.

In a water heater of what is called a forced exhaust type, a fan, a burner, a primary heat exchanger, and a secondary heat exchanger are arranged in this order from upstream to downstream in a flow of combustion gas. Namely, combustion gas produced in the burner is caused to flow into an exhaust tube outside the water heater by the fan through the primary heat exchanger and the secondary heat exchanger.

Combustion gas forced out of the fan receives flow path resistance produced by the primary heat exchanger and the secondary heat exchanger before it reaches the exhaust tube. Accordingly, a pressure with which combustion gas is sent, immediately before the exhaust tube, is lower by magnitude comparable to this flow path resistance. Therefore, in order to force combustion gas into the exhaust tube smaller in diameter, a fan blow pressure should be raised. When the fan blow pressure is raised, however, an internal pressure within a burner case becomes higher. Therefore, when a supply pressure of combustion gas supplied to the burner is relatively low, a combustion operation becomes unstable.

In contrast, according to the exhaust suction and combustion type in the present embodiment, burner 2, primary heat exchanger 3, secondary heat exchanger 4, and fan 6 are arranged in this order from upstream to downstream in the flow of combustion gas. With this type, a pressure is negative on the upstream side of fan 6. Thus, since an internal pressure within the burner case can be maintained low even though connection tube 8 is decreased in diameter, a combustion operation can be stabilized even when a supply pressure of combustion gas supplied to burner 2 is relatively low.

Figure 13:
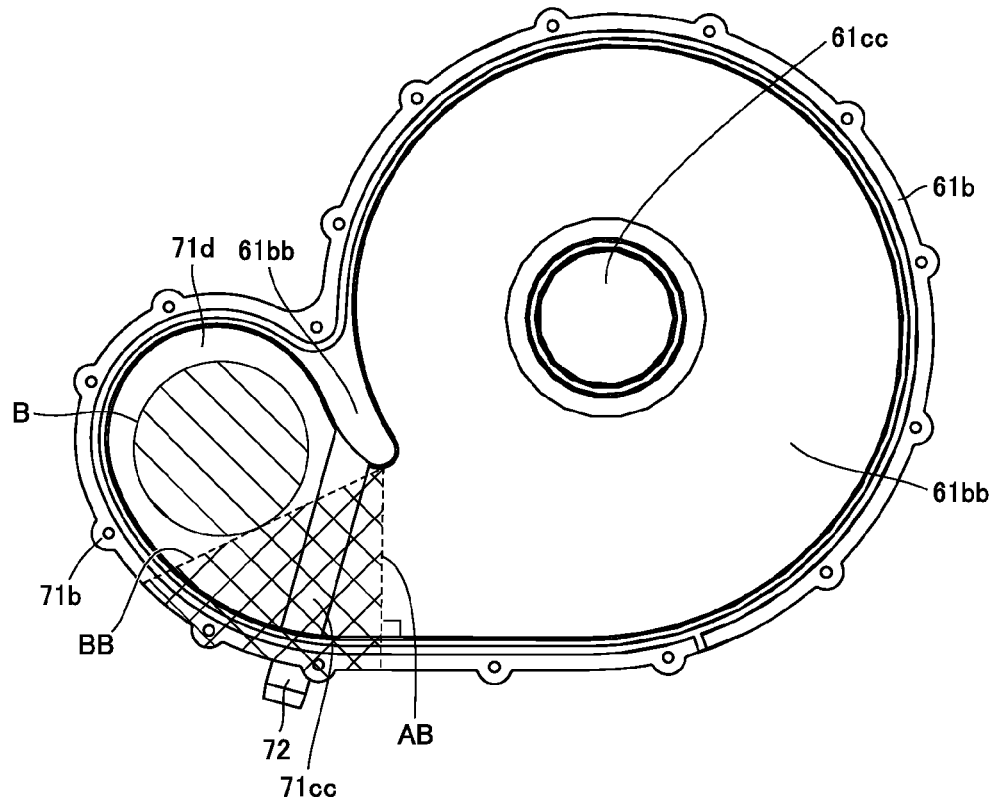
FIG. 13 is a diagram showing another configuration of the connection portion case, which is a top plan view schematically showing the fan case and the connection portion case in plan view as seen from the shaft direction of the rotation shaft of the fan.
Figure 14:
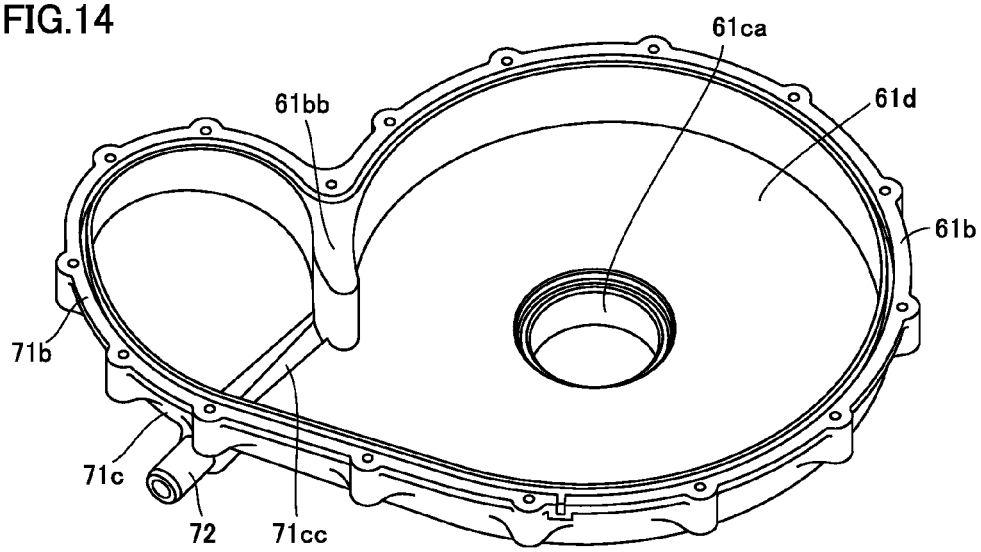
FIG. 14 is a perspective view schematically showing the fan case and the connection portion case shown in FIG. 13.
Figure 15:
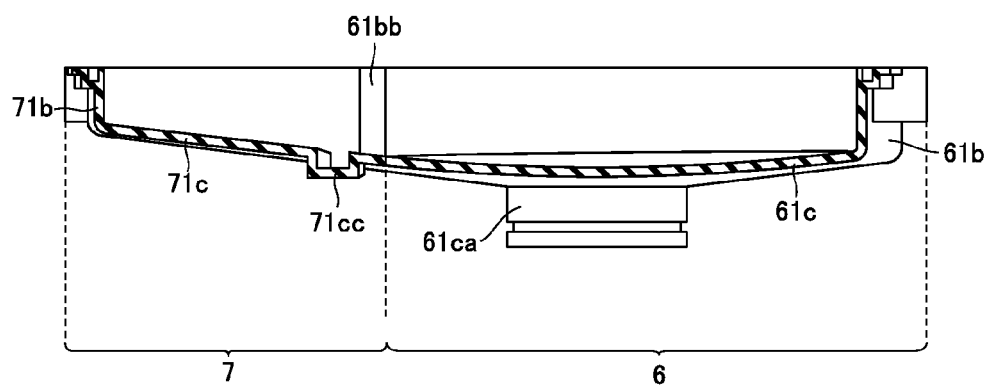
FIG. 15 is a cross-sectional view schematically showing the fan case and the connection portion case shown in FIG. 13.

It is needless to say that the present invention is not limited to the above-described present embodiment. For example, as shown in FIGS. 13 to 15, bottom wall 71c of connection portion case 71 may be provided with groove-shaped recess 71cc. Also in this case, as in the above description, drainage water suctioned up from secondary heat exchanger 4 by fan 6 and guided from fan 6 to exhaust connection portion 7 can be discharged from drainage water discharge portion 72.

Figure 16:
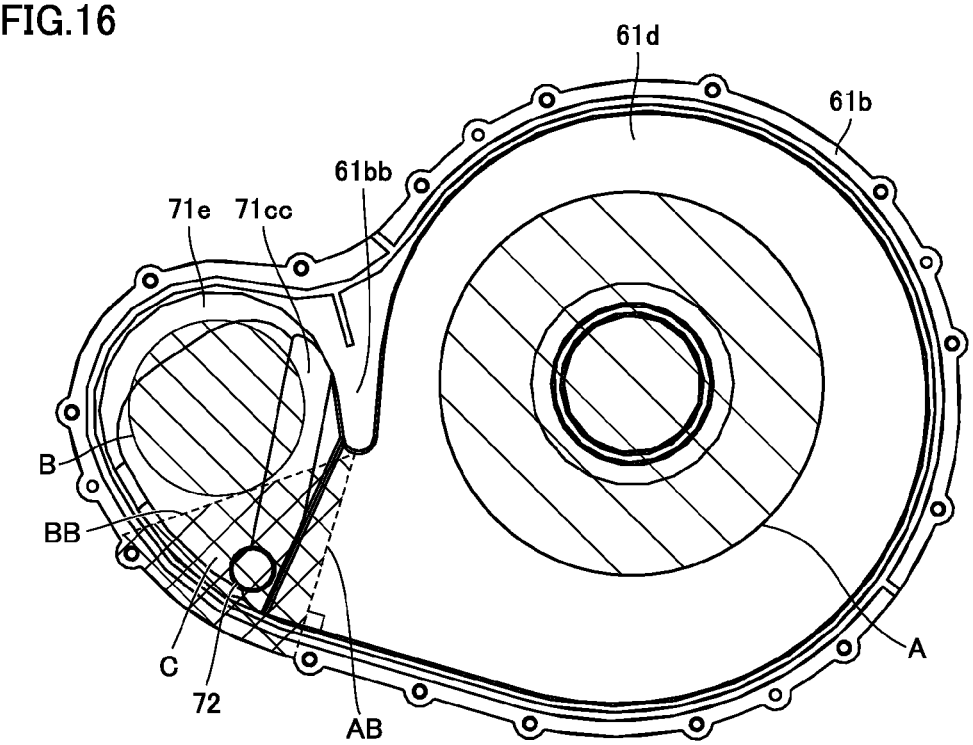
FIG. 16 is a diagram showing another configuration of the connection portion case, which is a top plan view schematically showing the fan case and the connection portion case in plan view as seen from the shaft direction of the rotation shaft of the fan.
Figure 17:
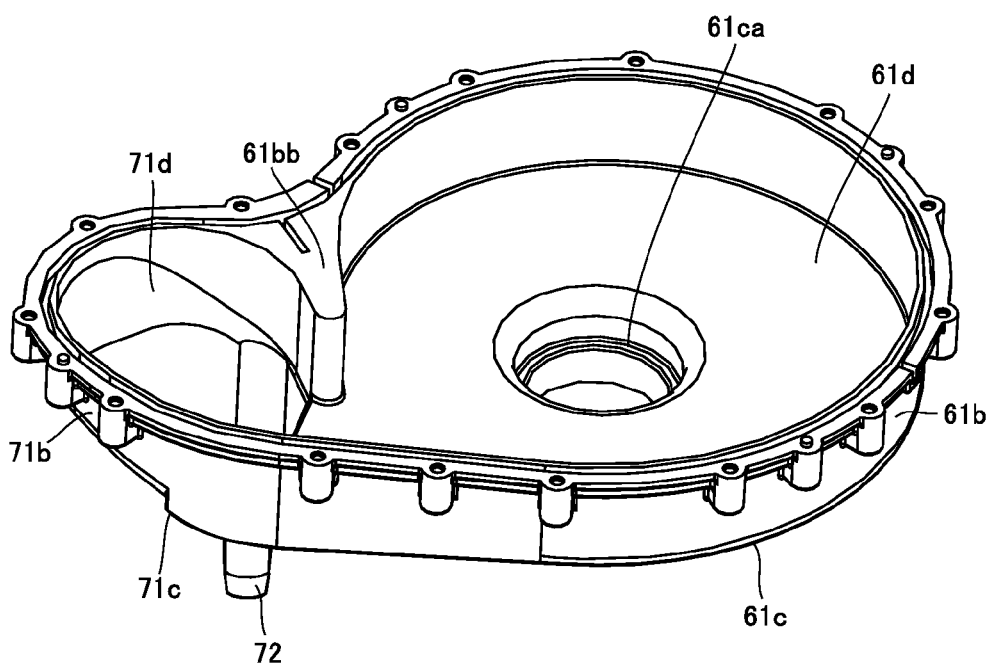
FIG. 17 is a perspective view schematically showing the fan case and the connection portion case shown in FIG. 16.
Figure 18:
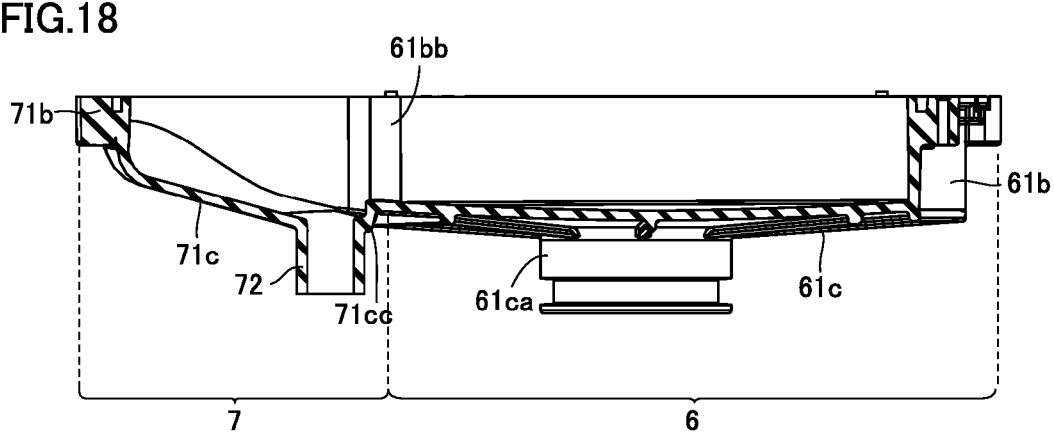
FIG. 18 is a cross-sectional view schematically showing the fan case and the connection portion case shown in FIG. 16.

Furthermore, for example, as shown in FIGS. 16 to 18, drainage water discharge portion 72 may be provided in bottom wall 71c at a position along circumferential wall 71b in region C. This allows more smooth discharge of drainage water after stopping fan 6.

FIGS. 7 to 18 each show the state where ceiling wall 61a of fan case 61 and ceiling wall 7a of connection portion case 71 are removed in order to clearly show the configuration of each of internal space 61d of fan 6 and internal space 71d of exhaust connection portion 7.

[Method of Removing Fan Set]

Then, a method of removing a fan set 67 from the above-described water heater 100 will be hereinafter described with reference to FIGS. 19 to 21. "Fan set 67" used herein is formed of fan 6 and exhaust connection portion 7.

Figure 19:
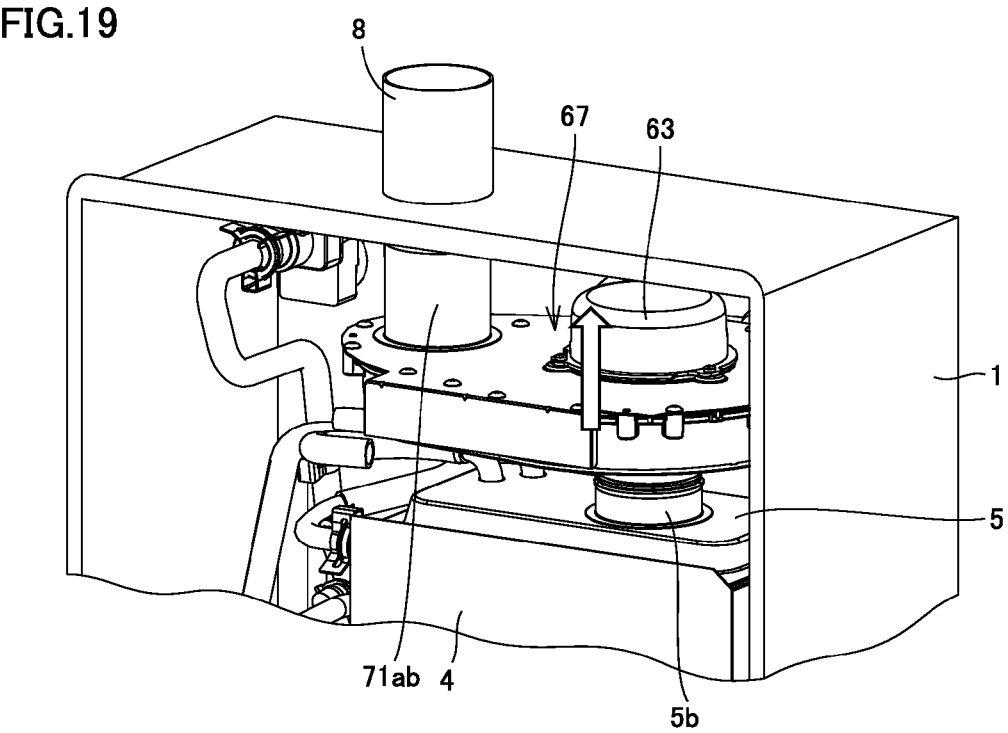
FIG. 19 is a partial perspective view for illustrating a process of removing a fan set from the water heater.

First referring to FIG. 19, a front cover of housing 1 is removed and fan set 67 is ready to be handled. Then, fan set 67 is moved upward as indicated by a hollow arrow in the figure. Thereby, protruding portion 61ca of fan case 61 is pulled out from fan connection portion 5b of exhaust box 5. In this case, since exhaust connection pipe 7ab is also moved upward, a region of connection tube 8 that is inserted into exhaust connection pipe 7ab is also increased (see FIG. 6).

In this case, in order to sufficiently pull out protruding portion 61ca from fan connection portion 5b, it is preferable that the length of connection tube 8 in the shaft direction (in the vertical direction in the figure) that protrudes into housing 1 is greater than the sum of the above-described moved distance and the length of a portion of connection tube 8 that is inserted into exhaust connection pipe 7ab in the normal installation state of fan set 67. Furthermore, it is also preferable that the length of exhaust connection pipe lab in the shaft direction is greater than the sum of the above-described moved distance and the length of a portion of connection tube 8 that is inserted in the normal installation state of fan set 67.

Figure 20:
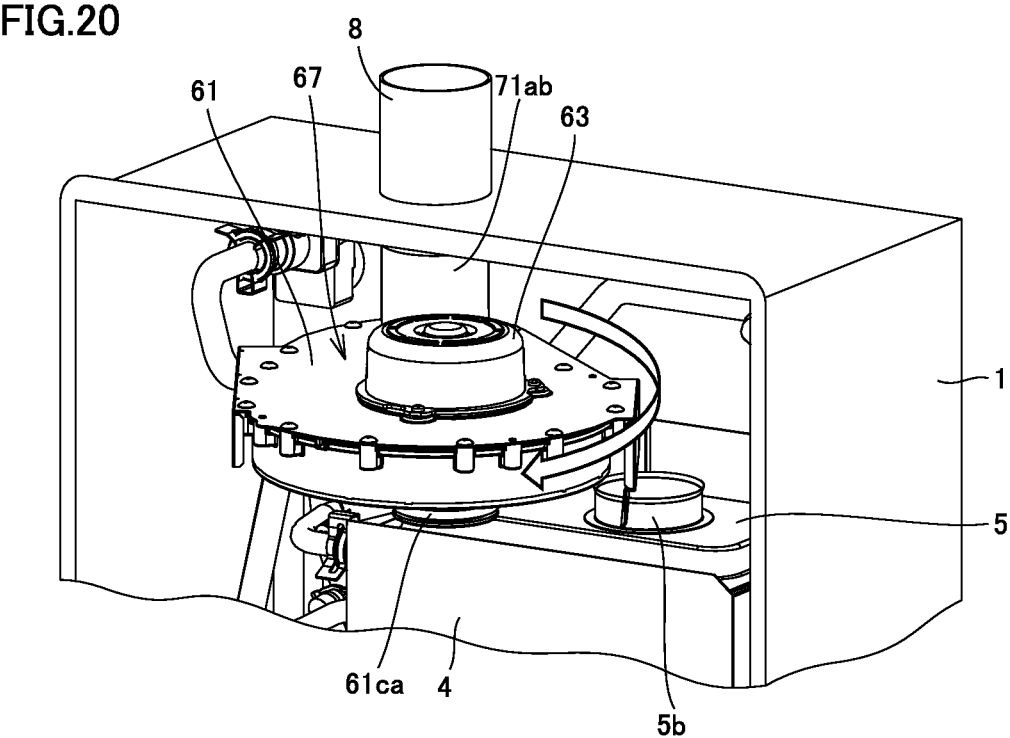
FIG. 20 is a partial perspective view for illustrating the process of removing a fan set from the water heater.

Then, referring to FIG. 20, fan set 67 that is removed from exhaust box 5 and attached to connection tube 8 is rotated as indicated by a hollow arrow in the figure. Thereby, a portion of fan set 67 on the fan 6 side is exposed to the outside of housing 1, so that subsequent handling of fan set 67 can be facilitated.

Figure 21:
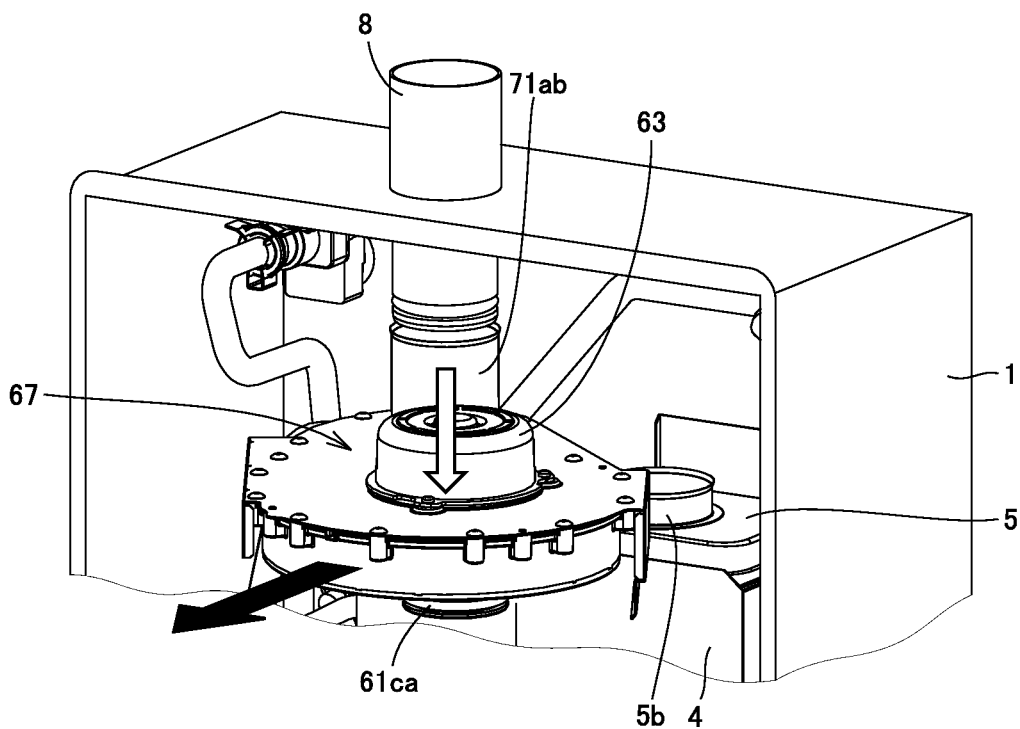
FIG. 21 is a partial perspective view for illustrating the process of removing a fan set from the water heater.

Then, referring to FIG. 21, fan set 67 is moved downward as indicated by a hollow arrow in the figure. Thereby, connection tube 8 is pulled out from exhaust connection pipe 71ab. In this case, it is feared that the lower region of fan set 67 may come in contact with the components located below fan set 67, for example, an exhaust box, at the time when connection tube 8 is pulled out. However, by rotating fan set 67 as shown in FIG. 20, a portion of fan set 67 located at the lowermost position, that is, protruding portion 61ca, is moved from the inside to the outside of housing 1. Consequently, the above-mentioned fear can be eliminated.

Then, as indicated by a black arrow in FIG. 21, fan set 67 can be completely removed from the inside of housing 1.

As having been described with reference to FIGS. 19 to 21, fan set 67 can be readily removed while preventing this fan set 67 from coming in contact with other components. Fan set 67, particularly fan 6, is a component that frequently requires repairs and the like as compared with other components. Accordingly, if fan set 67 can be readily removed, the above-mentioned requirements can be suitably fulfilled.

In the present embodiment, each part may be implemented by an inner cover or an outer cover with no particular limitation. For example, exhaust connection pipe 71ab may be inserted into connection tube 8 or fan connection portion 5b may be inserted into protruding portion 61ca.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A water heater of a latent heat recovery type capable of heating water by recovering latent heat of combustion gas, said water heater comprising:
   a burner including a plurality of burner port portions and generating combustion gas from an opening at an end of each of said plurality of burner port portions;
   a heat exchanger heating water flowing through inside by heat exchange with combustion gas generated in said burner;
   a fan including a fan case, an impeller housed within said fan case, a drive source attached to said fan case so as to drive said impeller, and a rotation shaft connecting said impeller and said drive source, and suctioning combustion gas having passed through said heat exchanger and emitting combustion gas to outside of said water heater; and
   an exhaust connection portion having a connection portion case and provided with an exhaust port for emitting combustion gas delivered from said fan to outside of said water heater,
   said exhaust connection portion having a drainage water discharge portion for discharging drainage water accumulated downstream of said fan in a path of a flow of combustion gas, wherein
   in plan view as seen from a shaft direction of said rotation shaft,
   a tongue portion extending between an internal space of said fan and an internal space of said exhaust connection portion is located at one end of a boundary between the internal space of said fan and the internal space of said exhaust connection portion,
   a circumferential wall of said fan case and a circumferential wall of said connection portion case are linearly connected to each other at the other end of said boundary, and
   said drainage water discharge portion is provided in a region surrounded by said boundary, said circumferential wall of said connection portion case and a tangent line of said exhaust port, and located along said circumferential wall of said connection portion case.

2. The water heater according to claim 1, wherein said drainage water discharge portion is located in said circumferential wall of said connection portion case.

3. The water heater according to claim 2, wherein
   said connection portion case has a bottom wall provided with a recess,
   a height position of said recess is located close to a height position of a reference plane including said opening as compared with a height position of a bottom wall of said fan case in said boundary, and
   said recess extends from said tongue portion toward said drainage water discharge portion.

4. The water heater according to claim 3, wherein said recess is inclined such that the height position of said recess comes close to said reference plane from said tongue portion toward said drainage water discharge portion.

5. The water heater according to claim 2, wherein said drainage water discharge portion is connected to said heat exchanger.

6. The water heater according to claim 2, wherein said fan case and said connection portion case are integrally formed.

7. The water heater according to claim 1, wherein
   said connection portion case has a bottom wall provided with a recess,
   a height position of said recess is located close to a height position of a reference plane including said opening as compared with a height position of a bottom wall of said fan case in said boundary, and
   said recess extends from said tongue portion toward said drainage water discharge portion.

8. The water heater according to claim 7, wherein said recess is inclined such that the height position of said recess comes close to said reference plane from said tongue portion toward said drainage water discharge portion.

9. The water heater according to claim 8, wherein said drainage water discharge portion is connected to said heat exchanger.

10. The water heater according to claim 7, wherein said drainage water discharge portion is connected to said heat exchanger.

11. The water heater according to claim 1, wherein said drainage water discharge portion is connected to said heat exchanger.

12. The water heater according to claim 1, wherein said fan case and said connection portion case are integrally formed.

13. A water heater of a latent heat recovery type capable of heating water by recovering latent heat of combustion gas, said water heater comprising:
- a burner including a plurality of burner port portions and generating combustion gas from an opening at an end of each of said plurality of burner port portions;
- a heat exchanger heating water flowing through inside by heat exchange with combustion gas generated in said burner;
- a fan including a fan case, an impeller housed within said fan case, a drive source attached to said fan case so as to drive said impeller, and a rotation shaft connecting said impeller and said drive source, and suctioning combustion gas having passed through said heat exchanger and emitting combustion gas to outside of said water heater; and
- an exhaust connection portion having a connection portion case and provided with an exhaust port for emitting combustion gas delivered from said fan to outside of said water heater,
- said exhaust connection portion having a drainage water discharge portion for discharging drainage water accumulated downstream of said fan in a path of a flow of combustion gas, wherein
- said drainage water discharge portion is connected to said heat exchanger.

14. The water heater according to claim 13, wherein said fan case and said connection portion case are integrally formed.

* * * * *